United States Patent
Wang et al.

(10) Patent No.: US 12,289,725 B2
(45) Date of Patent: Apr. 29, 2025

(54) IDENTIFIER REINTERPRETATION IN SIDELINK CONTROL INFORMATION

(71) Applicant: QUALCOMM Incorporated, San Diego, CA (US)

(72) Inventors: Hua Wang, Basking Ridge, NJ (US); Sony Akkarakaran, Poway, CA (US); Hong Cheng, Basking Ridge, NJ (US); Jung Ho Ryu, Fort Lee, NJ (US); Jelena Damnjanovic, Del Mar, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 488 days.

(21) Appl. No.: 17/858,733

(22) Filed: Jul. 6, 2022

(65) Prior Publication Data

US 2024/0015743 A1 Jan. 11, 2024

(51) Int. Cl.
 *H04W 72/20* (2023.01)
 *H04W 72/1263* (2023.01)
 *H04W 72/54* (2023.01)
 H04W 80/02 (2009.01)

(52) U.S. Cl.
 CPC ....... *H04W 72/20* (2023.01); *H04W 72/1263* (2013.01); *H04W 72/54* (2023.01); *H04W 80/02* (2013.01)

(58) Field of Classification Search
 CPC . H04W 72/20; H04W 72/1263; H04W 72/54; H04W 80/02; H04W 8/26; H04W 72/25
 See application file for complete search history.

(56) References Cited

U.S. PATENT DOCUMENTS

| 2021/0160778 A1* | 5/2021 | Ji | ............ H04W 52/0229 |
| 2023/0189390 A1* | 6/2023 | Park | ............ H04W 76/28 370/252 |
| 2023/0379912 A1* | 11/2023 | Ji | ............ H04W 72/20 |

* cited by examiner

Primary Examiner — Sharmin Chowdhury
(74) Attorney, Agent, or Firm — Holland & Hart / QUALCOMM Incorporated

(57) ABSTRACT

Methods, systems, and devices for identification reinterpretation in sidelink control information (SCI) are described. A first user equipment (UE) may transmit to a second UE or device, on a sidelink channel, SCI. The SCI may include a partial source and destination identifier fields and may indicate to the second UE to apply a first interpretation of multiple different interpretations for the partial source identifier field and the partial destination identifier field. For example, the SCI may indicate to interpret the partial source identifier field and the partial destination identifier field in combination as a source identifier field, as a destination identifier field, or as a partial source identifier and a partial destination identifier. The UE may transmit a medium access control (MAC) packet including a MAC header with identifier fields set to be complementary to the SCI.

30 Claims, 9 Drawing Sheets

805 — Transmit, on a sidelink channel, sidelink control information comprising a partial source identifier field and a partial destination identifier field, the sidelink control information indicating to apply a first interpretation of a plurality of different interpretations for the partial source identifier field and the partial destination identifier field, wherein the plurality of different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier 810 — Communicate on the sidelink channel based at least in part on the sidelink control information and the first interpretation for the partial source identifier field and the partial destination identifier field

IDENTIFIER REINTERPRETATION IN SIDELINK CONTROL INFORMATION

FIELD OF TECHNOLOGY

The following relates to wireless communications, including identifier reinterpretation in sidelink control information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support identifier reinterpretation in sidelink control information (SCI). For example, the described techniques provide for a transmitting UE to indicate how a receiving UE is to interpret identifier fields in an SCI message. In some examples, a transmitting UE may indicate either a complete source identifier or a complete destination identifier in SCI, such as second-stage SCI, and the receiving UE may interpret the identifier in the SCI accordingly. In some examples, the SCI may include one or more additional bits to indicate an interpretation for one or more identifier fields in the SCI (e.g., source and destination fields). For example, the additional bits may indicate to interpret the fields as a complete source identifier, as a complete destination identifier, or as indicating a partial source identifier and a partial destination identifier. In some examples, a format of the SCI may include the additional one or more bits, which may be used as an alternative to, or in addition to, an SCI format without the additional one or more bits. In some cases, the SCI may implicitly indicate an interpretation for the partial source and destination fields based on other fields of the SCI.

A method for wireless communications at a UE is described. The method may include transmitting, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier and communicating on the sidelink channel based on the SCI and the first interpretation for the partial source identifier field and the partial destination identifier field.

An apparatus for wireless communications at a UE is described. The apparatus may include a processor, memory coupled with the processor, and instructions stored in the memory. The instructions may be executable by the processor to cause the apparatus to transmit, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier and communicate on the sidelink channel based on the SCI and the first interpretation for the partial source identifier field and the partial destination identifier field.

Another apparatus for wireless communications at a UE is described. The apparatus may include means for transmitting, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier and means for communicating on the sidelink channel based on the SCI and the first interpretation for the partial source identifier field and the partial destination identifier field.

A non-transitory computer-readable medium storing code for wireless communications at a UE is described. The code may include instructions executable by a processor to transmit, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier and communicate on the sidelink channel based on the SCI and the first interpretation for the partial source identifier field and the partial destination identifier field.

In some examples of the method, apparatuses, and non-transitory computer-readable medium described herein, transmitting the SCI may include operations, features, means, or instructions for transmitting the SCI indicating to interpret the partial source identifier field and the partial destination identifier field in combination as the source identifier field or the destination identifier field based on one or more other fields of the SCI.

In some examples of the method, apparatuses, and non-transitory computer-readable medium described herein, the SCI indicates to interpret the partial source identifier field and the partial destination identifier field in combination as a source identifier field based on the SCI scheduling a channel state information (CSI) reference signal (CSI-RS).

In some examples of the method, apparatuses, and non-transitory computer-readable medium described herein, the SCI indicates to interpret the partial source identifier field and the partial destination identifier field as the destination identifier field based on the SCI scheduling resources on the sidelink channel.

In some examples of the method, apparatuses, and non-transitory computer-readable medium described herein, transmitting the SCI may include operations, features, means, or instructions for transmitting the SCI including one or more bits indicating the first interpretation for the partial source identifier field and the partial destination identifier field.

In some examples of the method, apparatuses, and non-transitory computer-readable medium described herein, the one or more bits indicate to interpret the partial source identifier field and the partial destination identifier field in combination as the source identifier field, or the partial source identifier field and the partial destination identifier field in combination as the destination identifier field, or the partial source identifier field as a partial source identifier and the partial destination identifier field as a partial destination identifier.

Some examples of the method, apparatuses, and non-transitory computer-readable medium described herein may further include operations, features, means, or instructions for transmitting a medium access control (MAC) packet including a MAC header, where the MAC header includes an identifier field based on the first interpretation for the partial source identifier field and the partial destination identifier field.

In some examples of the method, apparatuses, and non-transitory computer-readable medium described herein, the identifier field includes a source identifier based on the SCI indicating to interpret the partial source identifier field and the partial destination identifier field as the destination identifier field.

In some examples of the method, apparatuses, and non-transitory computer-readable medium described herein, the identifier field includes a destination identifier based on the SCI indicating to interpret the partial source identifier field and the partial destination identifier field as the source identifier field.

Some examples of the method, apparatuses, and non-transitory computer-readable medium described herein may further include operations, features, means, or instructions for receiving, from a second UE, an indication of a quantity of sidelink channels configured at the second UE, where the first interpretation for the partial source identifier field and the partial destination identifier field may be based on the quantity of sidelink channels configured at the second UE.

A method for wireless communications at a UE is described. The method may include receiving, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier, decoding the partial source identifier field and the partial destination identifier field based on the first interpretation, and communicating on the sidelink channel based on the SCI and the decoding.

An apparatus for wireless communications at a UE is described. The apparatus may include a processor, memory coupled with the processor, and instructions stored in the memory. The instructions may be executable by the processor to cause the apparatus to receive, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier, decode the partial source identifier field and the partial destination identifier field based on the first interpretation, and communicate on the sidelink channel based on the SCI and the decoding.

Another apparatus for wireless communications at a UE is described. The apparatus may include means for receiving, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier, means for decoding the partial source identifier field and the partial destination identifier field based on the first interpretation, and means for communicating on the sidelink channel based on the SCI and the decoding.

A non-transitory computer-readable medium storing code for wireless communications at a UE is described. The code may include instructions executable by a processor to receive, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier, decode the partial source identifier field and the partial destination identifier field based on the first interpretation, and communicate on the sidelink channel based on the SCI and the decoding.

In some examples of the method, apparatuses, and non-transitory computer-readable medium described herein, receiving the SCI may include operations, features, means, or instructions for receiving the SCI indicating to interpret the partial source identifier field and the partial destination identifier field in combination as the source identifier field or the destination identifier field based on one or more other fields of the SCI.

In some examples of the method, apparatuses, and non-transitory computer-readable medium described herein, the SCI indicates to interpret the partial source identifier field and the partial destination identifier field in combination as the source identifier field based on the SCI scheduling a CSI-RS.

In some examples of the method, apparatuses, and non-transitory computer-readable medium described herein, the SCI indicates to interpret the partial source identifier field and the partial destination identifier field as the destination identifier field based on the SCI scheduling resources on the sidelink channel.

In some examples of the method, apparatuses, and non-transitory computer-readable medium described herein, receiving the SCI may include operations, features, means, or instructions for receiving the SCI including one or more bits indicating the first interpretation for the partial source identifier field and the partial destination identifier field.

In some examples of the method, apparatuses, and non-transitory computer-readable medium described herein, the one or more bits indicate to interpret the partial source identifier field and the partial destination identifier field in combination as the source identifier field, or the partial source identifier field and the partial destination identifier field in combination as the destination identifier field, or the partial source identifier field as the partial source identifier and the partial destination identifier field as the partial destination identifier.

Some examples of the method, apparatuses, and non-transitory computer-readable medium described herein may further include operations, features, means, or instructions for receiving a MAC packet including a MAC header, where the MAC header includes an identifier field based on the first interpretation for the partial source identifier field and the partial destination identifier field.

In some examples of the method, apparatuses, and non-transitory computer-readable medium described herein, the identifier field includes a source identifier based on the SCI indicating to interpret the partial source identifier field and the partial destination identifier field as the destination identifier field.

In some examples of the method, apparatuses, and non-transitory computer-readable medium described herein, the identifier field includes a destination identifier based on the SCI indicating to interpret the partial source identifier field and the partial destination identifier field as the source identifier field.

Some examples of the method, apparatuses, and non-transitory computer-readable medium described herein may further include operations, features, means, or instructions for transmitting an indication of a quantity of sidelink channels configured at the UE, where the first interpretation for the partial source identifier field and the partial destination identifier field may be based on the quantity of sidelink channels configured at the UE.

BRIEF DESCRIPTION OF THE DRAWINGS

FIGS. 8 and 9 show flowcharts illustrating methods that support identifier reinterpretation in SCI in accordance with one or more aspects of the present disclosure.

DETAILED DESCRIPTION

Figure 1:
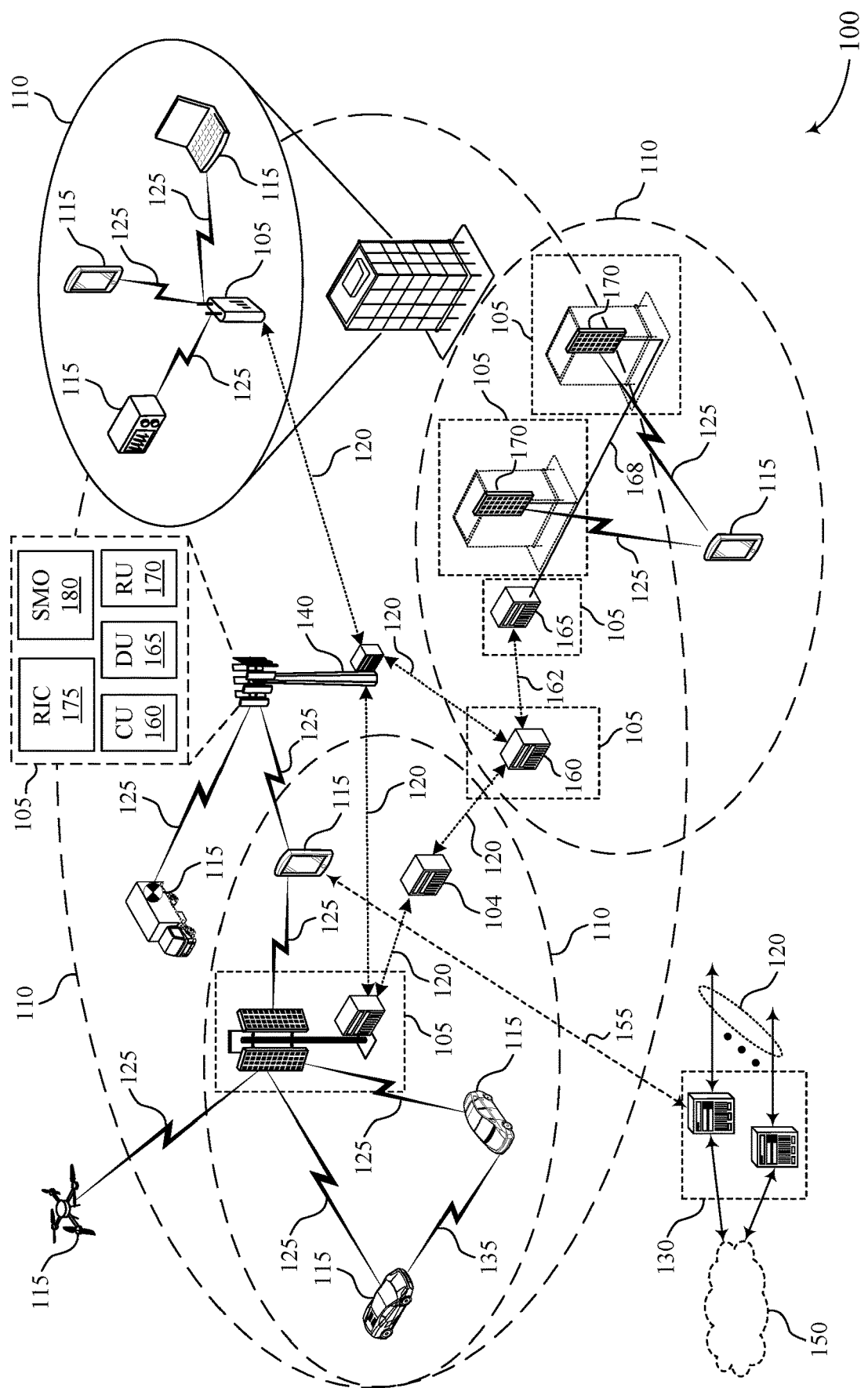
FIG. 1 illustrates an example of a wireless communications system that supports identifier reinterpretation in sidelink control information (SCI) in accordance with one or more aspects of the present disclosure.

A user equipment (UE) may communicate with another UE via sidelink communications. In some cases, a transmitting UE may transmit sidelink control information (SCI), such as second-stage SCI or SCI-2, on a sidelink shared channel to a receiving UE. The SCI-2 may include a source identifier field to indicate a portion of a source identifier and a destination identifier field to indicate portion of a destination identifier for a sidelink transmission. The transmitting UE may indicate remaining portions of the source identifier and the destination identifier in a medium access control (MAC) header of a MAC packet accompanying sidelink data. The receiving UE may determine the complete source identifier and the complete destination identifier based on the fields in the SCI and the MAC header. However, in some situations, a UE may transmit SCI without a corresponding MAC packet in the same transmission slot. For example, there may be a separation in time between the SCI and the sidelink data with the MAC packet, or the SCI may be transmitted without any data. In these examples, the receiving UE may not receive a complete source identifier or a complete destination identifier, which may lead to inefficiencies. For example, the receiving UE may perform unnecessary decoding on following data packets where the UE is not the intended receiver. In an example where SCI is transmitted standalone (e.g., without an accompanying data transmission), the receiving UE may not be able to verify whether the receiving UE is the intended receiver or identify the transmitting UE.

This disclosure seeks to provide techniques for a transmitting UE to indicate how a receiving UE is to interpret the identifier fields in an SCI. For example, by implementing these techniques, a transmitting UE may indicate either a complete source identifier or a complete destination identifier in SCI, such as SCI-2, and the receiving UE may interpret the identifier in the SCI accordingly. In some examples, the SCI may include one or more additional bits to indicate an interpretation for the partial source and destination fields in the SCI. For example, the additional bits may indicate to interpret the fields as a complete source identifier, as a complete destination identifier, or as partial source and partial destination identifiers (e.g., if there is a following MAC packet without a time gap). In some examples, a format of SCI-2 may include the additional one or more bits, which may be used as an alternative to, or in addition to, an SCI-2 format without the additional one or more bits. In some cases, the SCI may implicitly indicate an interpretation for the partial source and destination fields based on other fields of the SCI. For example, if the SCI schedules a channel state information reference signal (CSI-RS) without scheduling data, the fields in the SCI may be interpreted as a complete source identifier.

In some examples, the transmitting UE may include different information in identifier fields of a sidelink MAC header based on how the fields in the SCI are interpreted. For example, if the transmitting UE includes a complete source identifier in the SCI, the transmitting UE may include a complete destination identifier with the MAC header (e.g., instead of partial source and partial destination in both the SCI and the MAC header). In some examples, a format for the MAC header or contents of the MAC header may be based on the format of the SCI-2 with the one or more additional bits.

Aspects of the disclosure are initially described in the context of wireless communications systems. Aspects of this discloser are illustrated by and described with reference to a wireless communications diagram and process diagram that relate to identification reinterpretation in SCI. Aspects of the disclosure are further illustrated by and described with reference to apparatus diagrams, system diagrams, and flowcharts that relate to identifier reinterpretation in SCI.

FIG. 1 illustrates an example of a wireless communications system 100 that supports identifier reinterpretation in SCI in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child TAB node 104 to receive signaling from a parent TAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through TAB nodes 104, or may directly signal transmissions to a UE 115, or both. The CU 160 of IAB donor may signal communication link establishment via an F1 interface to IAB nodes 104, and the TAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of TAB node 104.

In the case of the techniques described herein applied in the context of a disaggregated RAN architecture, one or more components of the disaggregated RAN architecture may be configured to support identifier reinterpretation in SCI as described herein. For example, some operations described as being performed by a UE 115 or a network entity 105 (e.g., a base station 140) may additionally, or alternatively, be performed by one or more components of the disaggregated RAN architecture (e.g., TAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of an RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $\Delta_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may transmit SCI, such as SCI-2, to another UE 115. The SCI may include scheduling information for a sidelink transmission (e.g., a sidelink data transmission). The SCI may include a portion of a source identifier (e.g., indicated via a source identifier field) and a portion of a destination identifier (e.g., indicated via a destination identifier field) for a sidelink transmission. Some formats of SCI-2 may include 8 bits for a source identifier field and 16 bits for a destination identifier field. The rest of the source identifier and the destination identifier may be indicated via fields in a MAC header of a MAC packet accompanying the sidelink transmission (e.g., the sidelink data transmission). Some sidelink MAC header fields may include 16 bits for a source identifier field and 8 bits for a destination identifier field. Therefore, using the 8 source identifier bits from the SCI and 16 source identifier bits from the MAC header, two UE participates may communicate a complete 24 bit source identifier. Similarly, using the 16 destination identifier bits for in the SCI and 8 destination identifier bits in a MAC header, the UE participates may communicate a complete 24 bit destination identifier. The destination identifier, or target identifier, and source identifier may be included as part of the SCI and the MAC header of a sidelink transmission to identify the source and destination of the transmission, or the transmitting UE 115 and the receiving UE 115 respectively.

The UE 115 receiving the transmissions may determine the complete source identifier and the complete destination identifier based on the SCI and the MAC header. In some examples, the identifiers may be Layer 2 (L2) identifiers. For example, a transmitting UE 115 may indicate a source identifier (e.g., a 24 bit source identifier) or a destination identifier (e.g., a 24 bit destination identifier), or both, via the SCI-2 or MAC header, or both. Data may accompany the MAC packet.

Some systems may not support a time gap between first-stage SCI, second-stage SCI, and sidelink data, or any combination thereof. As such, these systems may use a same beam for each of the first-stage SCI, second-stage SCI, and sidelink data transmission.

Some wireless communications systems, such as the wireless communications system 100, may support a time gap between SCI-1, SCI-2, and sidelink data, or any combination thereof. For example, the wireless communications system 100 may support standalone SCI, which may enable a time gap between sidelink control signaling and sidelink data signaling. Some SCI formats may include fields or information to support beam indication for sidelink communications (e.g., dynamic beam indication).

A first type of standalone SCI may be transmitted with an accompanying sidelink data transmission, but the standalone SCI and the sidelink data transmission may be separated in time. For a second type of standalone SCI, a UE 115 may not have a sidelink data transmission. For example, the UE 115 may transmit the standalone SCI without an accompanying data transmission or MAC packet.

Standalone SCI may, in some cases, be used for sidelink relay communications. For sidelink relay, a deactivated relay may maintain a sidelink with the target, or receiving UE 115, without sending data through the sidelink. To measure sidelink quality for possible relay switching, the receiving UE 115 or the relay UE 115 may send sidelink CSI-RS. In these examples, the receiving UE 115 may not receive a complete source identifier or a complete destination identifier from the SCI. For example, if the receiving UE 115 receives the SCI but not the MAC packet, the receiving UE 115 may have 8 bits of the source identifier and 16 bits of the destination identifier. The incomplete identifiers may lead to ambiguity, where the receiving UE 115 may not have the information to determine the intended receiver or the source of the SCI transmission. In some other examples, if the MAC packet and data following the SCI are separated by a time gap, the receiving UE 115 may receive the MAC header or data packet after a time gap from receiving the SCI. The receiving UE 15 may perform decoding on following data packets after the time gap, but the decoding may be unnecessary if the UE 115 is not the intended receiver.

In some systems, when a UE 115 transmits standalone SCI and there is a time gap between the standalone SCI and a MAC packet, or there is no MAC packet, a receiving UE 115 may not receive the complete source and destination identifiers, as the receiving UE 115 may only receive the partial source identifier and partial destination identifier in the standalone SCI. Therefore, UEs 115 in these systems may not be able to identify the intended receiver for the transmission or identify the transmitting device.

This disclosure seeks to provide techniques for a transmitting UE 115 to indicate how a receiving UE 115 is to interpret the identifier fields in an SCI. For example, the transmitting UE 115 may use both the partial source identifier field and the partial destination identifier field in an SCI-2 to indicate either a complete (e.g., 24-bit) source identifier or destination identifier. In some examples, the SCI may include one or more bits (e.g., one or more additional bits) to indicate an interpretation for the partial source and destination fields in the SCI. For example, the additional bits may indicate to interpret the fields as a source identifier, as a destination identifier, or as partial source and partial destination identifiers (e.g., if there is a following MAC packet without a time gap). In some examples, a format of SCI-2 may include the additional one or more bits, which, which may be used as an alternative to, or in addition to, an SCI-2 format without the additional one or more bits. In some cases, the SCI may implicitly indicate how to interpret the source and destination fields based on other fields of the SCI. For example, if the SCI schedules a CSI-RS without scheduling data, the fields in the SCI may be interpreted as a complete source identifier.

In some examples, the SCI may include a 24-bit source identifier field and a 24 bit destination identifier field, or both, as part of the SCI. In some other examples, such as if there is not a following MAC header and data, a dummy data packet may be transmitted that indicates the rest of the identifiers.

Figure 2:
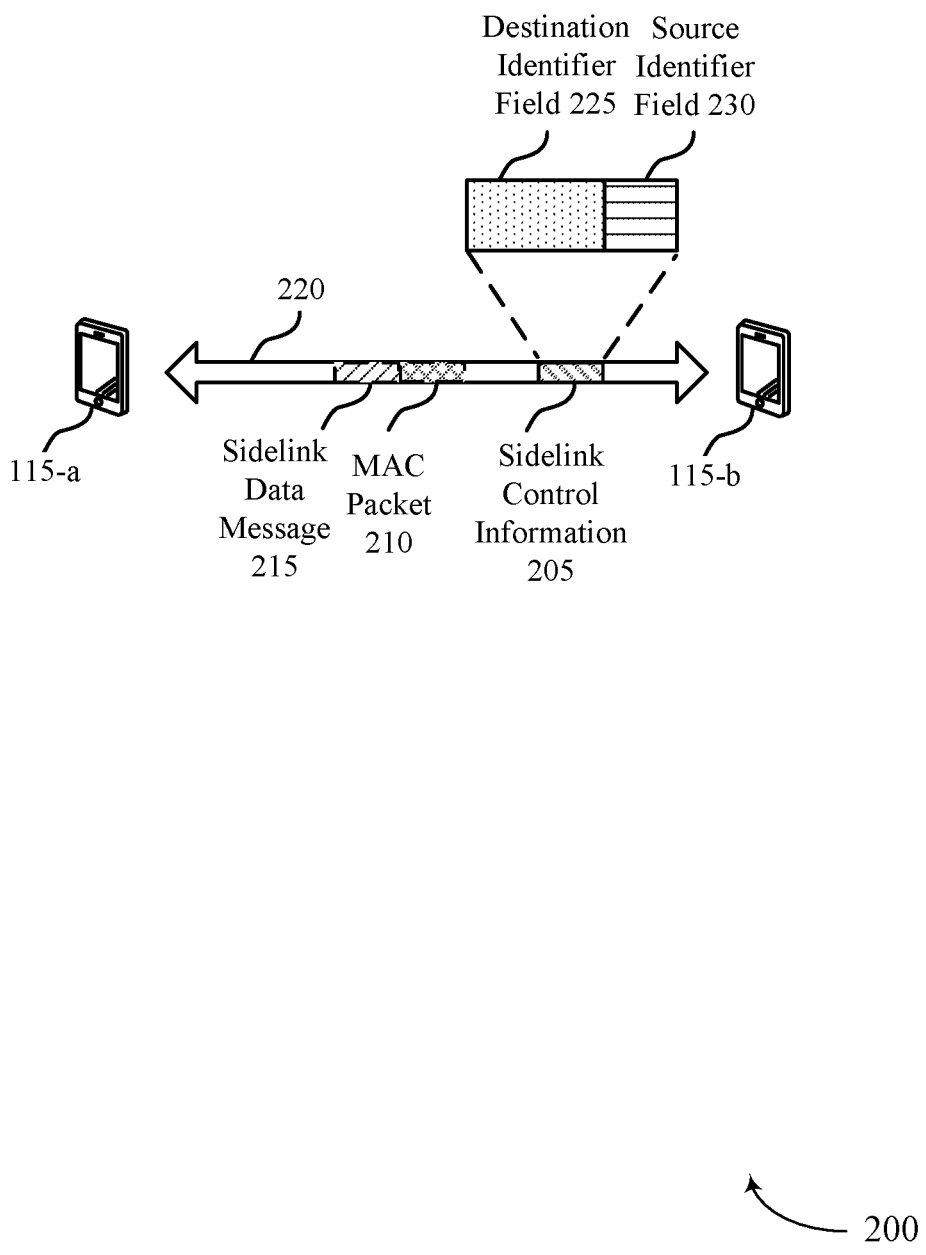
FIG. 2 illustrates an example of a wireless communications diagram that supports identifier reinterpretation in SCI in accordance with one or more aspects of the present disclosure.

FIG. 2 illustrates an example of a wireless communications system 200 that supports identifier reinterpretation in SCI in accordance with one or more aspects of the present disclosure. FIG. 2 describes sidelink communications between two UEs 115, such as a UE 115-a and a UE 115-b. The UE 115-a and the UE 115-b may be examples of a UE 115 as described with reference to FIG. 1.

The wireless communications system 200 may support techniques for a UE 115, such as the UE 115-a, to indicate how another UE 115, such as the UE 115-b, is to interpret the identifier fields in SCI 205. For example, the UE 115-a may be an example of a transmitting UE 115 or a source, and the UE 115-a may transmit the SCI 205 to the UE 115-b, which may be an example of a receiving UE 115 or a destination. In some examples, the UE 115-a may transmit the SCI 205, a MAC packet 210, or a sidelink data message 215, or any combination thereof, to the UE 115-b. In some examples, there may be a time-gap between the SCI 205 and the MAC packet 210 transmitted with the sidelink data message 215. Additionally, or alternatively, the UE 115-a may transmit the SCI 205 without the MAC packet 210 or the sidelink data message 215. The SCI 205 may indicate either a complete source identifier or a complete destination identifier, while increasing performance of the SCI 205 and reducing the unnecessary data traffic.

In some examples, the SCI 205 may be an example of a standalone SCI, SCI scheduling sidelink CSI-RS without data, or another type of SCI (e.g., with another format). The SCI 205 may include one or more identifier fields, which may be used to indicate at least a portion of one or more L2 identifiers, such as a source identifier or a destination identifier. For example, the SCI 205 may include a partial source identifier field 230 and a partial destination identifier field 225. However, such as if the SCI 205 is a standalone SCI, there may be a gap between the SCI 205 and the MAC packet 210, or the MAC packet 210 and the sidelink data message 215 may not be transmitted at all.

In some examples, the UE 115-a may set the identifier fields in the SCI 205 (e.g., the partial source identifier field 230 and the partial destination identifier field 225) to indicate a complete source identifier or a complete destination identifier. In some examples, the UE 115-a may indicate how the UE 115-b is to interpret the identifiers in the SCI 205 based on an indication through one or more additional bits.

In some examples, only the source identifier or only the destination identifier may be applicable. For example, the UE 115 receiving the transmission (e.g., UE 115-b) may decode the destination identifier to determine whether it (e.g., the receiving UE 115) is the intended receiver. For example, the UE 115-a may transmit a standalone SCI to the UE 115-b for resource allocation, where the UE 115-b does not need the source identifier but does need the destination identifier. In another example, the receiving UE 115 may only need the source identifier. For example, a target UE 115 may send standalone sidelink CSI-RS in a sidelink relay configuration. A relay UE 115 may check whether a source identifier of an SCI is the target UE, and the relay UE 115 may know which target UE 115 to report a CSI measurement result to.

In examples where only one of the two identifiers is used, the partial source identifier field 230 and the partial destination identifier field 225 may be used to indicate the relevant identifier. For example, for a standalone SCI that is transmitted for resource allocation, the partial source identifier field 230 and the partial destination identifier field 225 may indicate a destination identifier. For a standalone SCI that is transmitted for sidelink CSI-RS in a sidelink relay configuration, the partial source identifier field 230 and the partial destination identifier field 225 may indicate a source identifier. In some cases, which identifier the fields correspond to may be implicit, such as being based on other fields of the standalone SCI, or explicit, based on an explicit indication included in the standalone SCI.

In some examples, the SCI 205 may include one or two bits to indicate an interpretation for the partial source and destination fields. For example, the SCI 205 may have a format including one or two additional bits to explicitly indicate the interpretation for the fields. For example, the additional bits may indicate to the UE 115-b to interpret the combined fields together as a source identifier or as a destination identifier (e.g., the SCI 205 may be interpreted as a complete source identifier of a complete destination identifier). In some examples, the additional bits may indicate to the UE 115-b that the bit fields are not to be interpreted differently from previous SCI formats (e.g., not to be interpreted as a single field) and interpret the partial source identifier field 230 as indicating a portion of a source identifier and the partial destination identifier field 225 as indicating a portion of a destination identifier.

For example, the additional bits may indicate to interpret the fields as a source identifier, as a destination identifier, or as a partial source identifier field 230 and a partial destination identifier field 225 (e.g., if there is a following MAC packet 210 without a time gap). In some cases, the additional two bits may be referred to as identifier format bits. In some cases, an SCI format with the additional bits may be referred to as a second SCI format, where an SCI format without the additional bits to indicate the interpretation may be referred to as a first SCI format. For example, the identifier format bits set to '00' may indicate to interpret the partial source and destination identifier fields as partial source and destination identifiers (e.g., no change to the interpretation of the partial source identifier field 230 and partial destination identifier field 225). A value of '01' may indicate to interpret the identifier fields in the SCI (e.g., the 16 bit destination identifier and the 8 bit source identifier) as a 24 bit destination identifier, and a value of '10' may indicate to interpret the identifier fields in the SCI (e.g., the 16 bit destination identifier and the 8 bit source identifier) as a 24 bit source identifier.

In some examples, the SCI 205 may include one additional bit to indicate the interpretation. For example, a third format of the SCI 205 may include one additional bit, where the third format may be used in addition to, or as an alternative to, the first format or the second format, or both. In some examples, the default interpretation may be the interpretation of the fields as a partial source identifier field 230 and a partial destination identifier field 225, or the first SCI format. If the SCI 205 is formatted according to a format with the additional bit, the additional bit may be added to indicate a new interpretation of the destination identifier and the source identifier. For example, a bit value of 1 may indicate that the identifier fields in the SCI 205 are to be interpreted together as a destination identifier (e.g., a 24-bit destination identifier), and a bit value of 0 may indicate the identifier fields in the SCI 205 are to be interpreted together as a source identifier (e.g., a 24-bit source identifier). If the SCI 205 does not include the additional bit (e.g., the SCI 205 is formatted according to the first format), the partial source and destination identifier fields may be interpreted as partial source and destination identifier fields. For example, if the SCI 205 is formatted according to a format without the additional bit, the UE 115-*b* may interpret the fields of the SCI-2 as indicating a 16-bit destination identifier and an 8-bit source identifier.

In some examples, a MAC header of a MAC packet 210 may also be updated to reflect the additional bits. For example, if there is sidelink data after the SCI-2 with a new format L2 identifier (e.g., some standalone SCI cases), the L2 identifier in the sidelink MAC header may also be updated. For example, the SCI 205 may be transmitted with data and corresponding MAC packet, but there may be a time gap between the SCI 205 and the MAC packet 210. Therefore, one of the identifiers (e.g., the source identifier or the destination identifier) may be indicated via the identifier fields of the SCI 205, and the other identifier may be indicated via the identifier fields of the MAC header of the MAC packet 210.

For example, if the identifier fields of the SCI 205 are transmitted to indicate a full source identifier or a full destination identifier, the identifier fields of the MAC packet 210 may be used to indicate the other identifier. For example, if the identifier (e.g., the L2 identifier) in the SCI-2 indicates a 24-bit destination identifier, the octet 2 (Oct2) to Oct4 of the MAC header may be the 24-bit source identifier. If the L2 identifier in the SCI-2 indicates a 24 bit source identifier, the Oct2 to Oct4 of the MAC header may be the 24 bit destination identifier. By indicating the other identifier via the MAC header, a receiving UE 115 may receive both the source and destination identifier.

In some examples, the SCI 205 may implicitly indicate how to interpret the partial source identifier field 230 and the partial destination identifier field 225 based on other fields of the SCI 205. For example, the UE 115-*a* may transmit the SCI 205 with a format that does not include additional bits for an explicit indication of how to interpret the identifier fields, but the UE 115-*b* may determine how to interpret the fields based on, for example, what the SCI 205 is scheduling or other parameters of the SCI 205. For example, if the SCI 205 schedules a CSI-RS without scheduling data, the UE 115-*a* may indicate a complete source identifier using the destination and source identifier fields in the SCI 205, as the UE 115-*b* may need to identify the source identifier but not the destination identifier. The UE 115-*b* may interpret the destination and source identifier fields as a complete source identifier implicitly based on the SCI 205 being used to schedule CSI-RS without scheduling data.

In some examples, the UE 115-*a* and the UE 115-*b* may exchange sidelink parameter information to determine how to indicate identifiers in the SCI 205. For example, the UE 115-*a* and the UE 115-*b* may exchange sidelink parameter information to determine how to set the identifier format bits (e.g., the one or more additional bits) or the identifier bits (e.g., the partial destination identifier field 225 or the partial source identifier field 230, or both) in the SCI 205, or both. In some examples, the UE 115-*a* and the UE 115-*b* may exchange the quantity of sidelinks each device has configured, and the transmitting UE 115 may use the number of sidelinks to determine how to set the second SCI 205 format bits.

For example, if the UE 115-*a* and the UE 115-*b* only have the sidelink 220 between them, and do not have additional sidelinks connections with other devices, the SCI 205 may be set as a destination identifier (e.g., a 24 bit destination identifier), which may prevent the receiving UE 115 from performing unnecessary decoding. If the SCI 205 is transmitted in a format without the additional bits (e.g., the first format), another nearby sidelink transmission may have the same abbreviated destination identifier as the receiving UE 115 when only using the partial destination identifier field of the first format (e.g., using the 16 bit partial destination identifier field). For example, if a transmitter UE 115 and a receiver UE 115 both have a sidelink connection between the transmitter and receiver as the only sidelink those devices are involved in, the sidelink L2 identifier in SCI-2 may be set as a 24 bit destination identifier to avoid the receiver UE 115 performing unnecessary decoding. For example, if using a current format (e.g., indicating partial source and destination identifiers), another nearby SL transmission may have a 16 bit destination identifier that is the same as that of the receiving UE 115.

Figure 3:
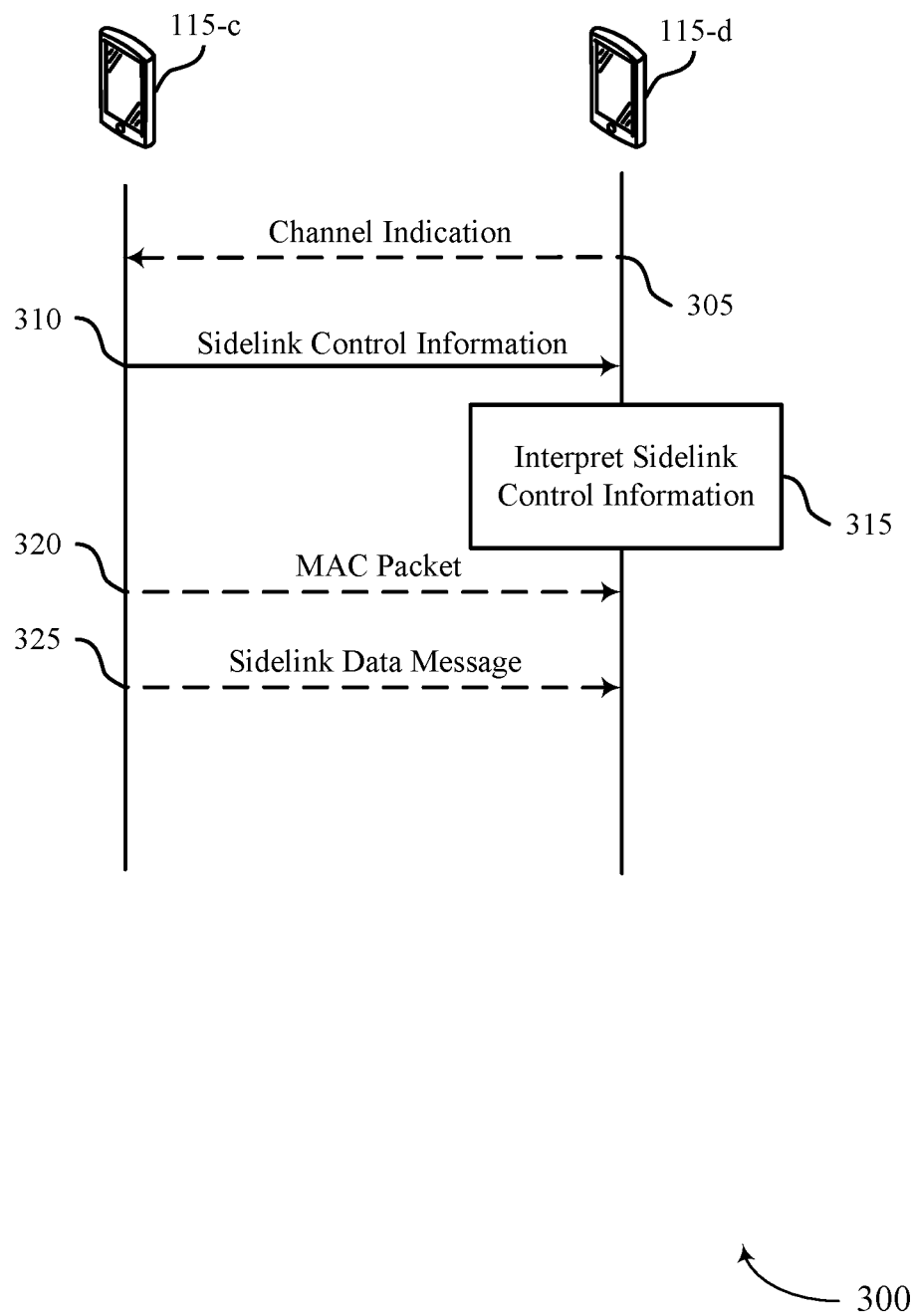
FIG. 3 illustrates an example of a process flow that supports identifier reinterpretation in SCI in accordance with one or more aspects of the present disclosure.

FIG. 3 illustrates an example of a process flow 300 that supports identifier reinterpretation in SCI in accordance with one or more aspects of the present disclosure. The UE 115-*c* and the UE 115-*d* may be each be an example a UE 115, such as a UE 115 as described with reference to FIG. 1 or a UE 115-*a* or a UE 115-*b* as described with reference to FIG. 2. In general, the process flow 300 illustrates a process for a transmitting UE 115 (e.g., UE 115-*c*) to indicate how a receiving UE 115 (e.g., UE 115-*d*) is to interpret the identifier fields in a SCI. In some other examples, the receiving UE may be the UE 115-*c* and the transmitting UE may be the UE 115-*d*.

In some examples, the UEs 115 may exchange sidelink configuration parameters. For example, at 305, the first UE 115-*c* may receive, from the second UE 115-*d*, an indication of a quantity of sidelink channels configured at the second UE 115-*d*. In some cases, the UE 115 may send SCI with identifier fields set based on the sidelink configuration parameters. If, for example, the UE 115-*c* or the UE 115-*d*, or both, only have a single sidelink connection, a transmitting UE 115 may indicate a complete destination identifier in an SCI transmission instead of indicating any source identifier information. In this example, the source identifier for a sidelink transmission may be known to correspond to the other UE 115 based on only have one establish sidelink, but two different UEs 115 may appear to have a same destination identifier indicated using just a partial identifier field.

At 310, the first UE 115-*c* may transmit, on a sidelink channel, SCI including a partial source identifier field and a partial destination identifier field. In some examples, the SCI may be standalone SCI, SCI scheduling CSI-RS without data, or other formats. The SCI may indicate to apply a first interpretation of one or more different interpretations for the partial source identifier field and the partial destination identifier field. The one or more interpretations may correspond to interpreting the partial source identifier field and the partial destination identifier field in combination as a source identifier field, in combination as a destination identifier field, or the partial source identifier field as a partial source identifier and the partial destination identifier field as a partial destination identifier.

In some examples, the SCI may indicate to the UE 115-*d* to interpret the partial source identifier field and the partial destination identifier field in combination as the source identifier field or the destination identifier field. The interpretation may be based on one or more other fields of the SCI, such as one or more additional bits. The SCI may indicate to interpret the partial source identifier field and the partial destination identifier field in combination as a source identifier field based at least in part on the SCI scheduling a CSI-RS, or may indicate to interpret the partial source identifier field and the partial destination identifier field as the destination identifier field based on the SCI scheduling resources on the sidelink channel. The first UE 115-*c* may transmit the SCI, which may include one or more bits indicating the first interpretation for the partial source identifier field and the partial destination identifier field. An SCI format which includes the additional bits may be referred to as a second SCI format. The one or more bits may indicate to interpret the partial source identifier field and the partial destination identifier field in combination as the source identifier field, in combination as the destination identifier field, or as a partial source identifier and a partial destination identifier.

At 315, the UE 115-*d* may interpret the SCI. The UE 115-*d* may decode the partial source identifier field and the partial destination identifier field based on the first interpretation (e.g., as a destination identifier field or a source identifier field). The UE 115-*d*, the UE 115-*c*, or both may communicate on the sidelink channel based on the SCI and the decoding.

The UE 115-*c* or the UE 115-*d*, or both, may communicate on the sidelink channel based on the SCI and the first interpretation for the partial source identifier field and the partial destination identifier field. For example, the UE 115-*c* may, in some cases, transmit a MAC packet to the UE 115-*d* at 320. There may be a time gap between 310 and 320, or a time gap between the transmission of the SCI and the MAC packet. The MAC packet may include a MAC header, and the MAC header may include an identifier field based on the first interpretation for the partial source identifier field and the partial destination identifier field. In some examples, the MAC header may be set according to the identifiers included in the SCI. For example, the identifier field of the MAC header may indicate a source identifier based on the SCI indicating to interpret the partial source identifier field and the partial destination identifier field as the destination identifier field. In some other examples, the identifier field of the MAC header may indicate a destination identifier based on the SCI indicating to interpret the partial source identifier field and the partial destination identifier field as the source identifier field.

In some cases, at 325, the UE 115-*c* may transmit a sidelink data message to the UE 115-*d*. The sidelink data message may be transmitted with the MAC packet. The source identifier and destination identifier included in the SCI identify the sender and intended receiver of the sidelink data message. In some examples, there may be a time gap between the transmission of the SCI and the sidelink data message, where the sidelink data message accompanies or is transmitted with the MAC packet.

Figure 4:
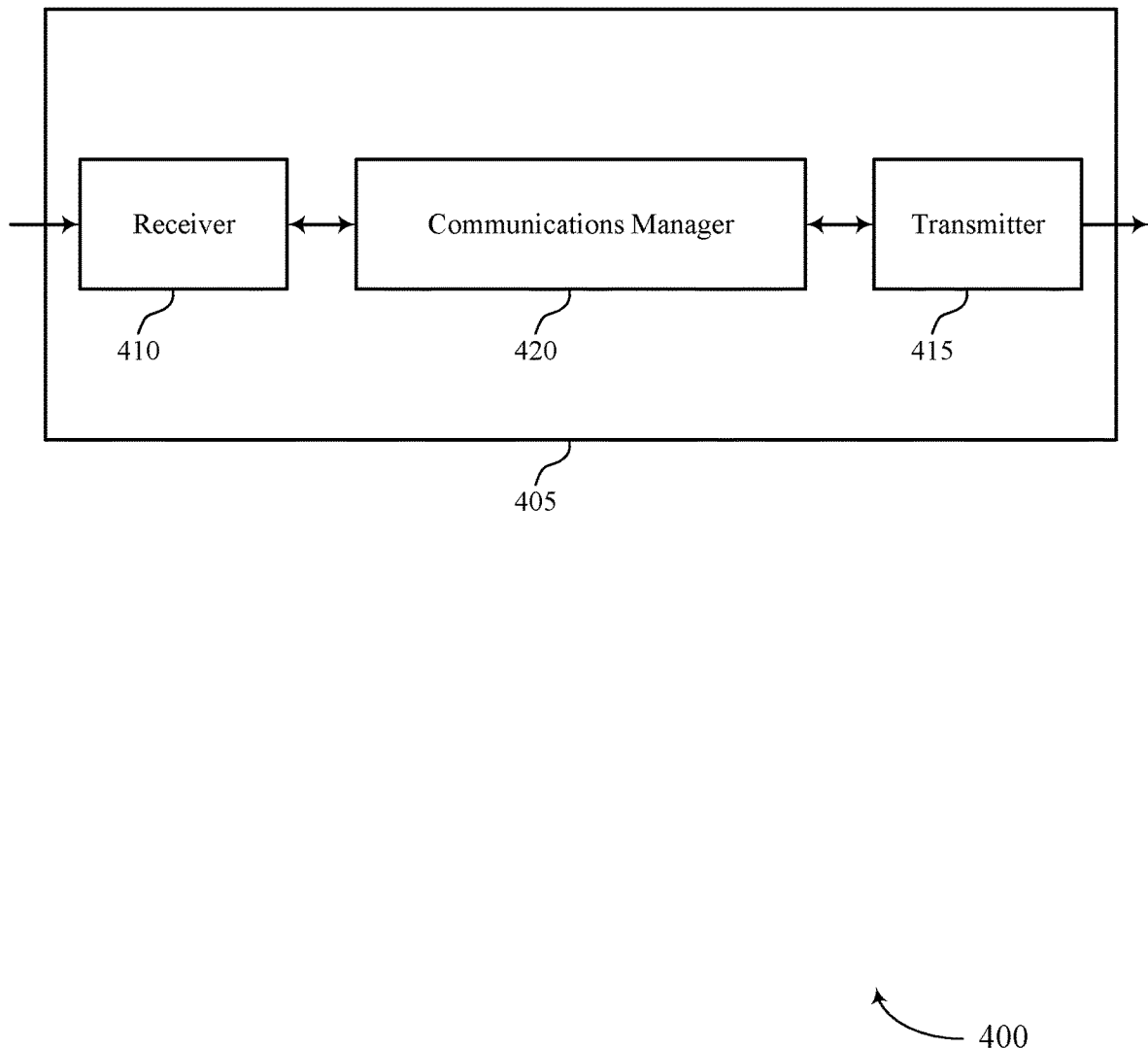
FIGS. 4 and 5 show block diagrams of devices that support identifier reinterpretation in SCI in accordance with one or more aspects of the present disclosure.

FIG. 4 shows a block diagram 400 of a device 405 that supports identifier reinterpretation in SCI in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to identifier reinterpretation in SCI). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to identifier reinterpretation in SCI). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of identifier reinterpretation in SCI as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a UE in accordance with examples as disclosed herein. For example, the communications manager 420 may be configured as or otherwise support a means for transmitting, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier. The communications manager 420 may be configured as or otherwise support a means for communicating on the sidelink channel based on the SCI and the first interpretation for the partial source identifier field and the partial destination identifier field.

Additionally, or alternatively, the communications manager 420 may support wireless communications at a UE in accordance with examples as disclosed herein. For example, the communications manager 420 may be configured as or otherwise support a means for receiving, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier. The communications manager 420 may be configured as or otherwise support a means for decoding the partial source identifier field and the partial destination identifier field based on the first interpretation. The communications manager 420 may be configured as or otherwise support a means for communicating on the sidelink channel based on the SCI and the decoding.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing and reduced power consumption. For example, indicating a complete source or destination identifier in standalone SCI may reduce decoding a receiving device, as the receiving device may determine whether a sidelink transmission is intended for the receiving device based on the complete identifier.

Figure 5:
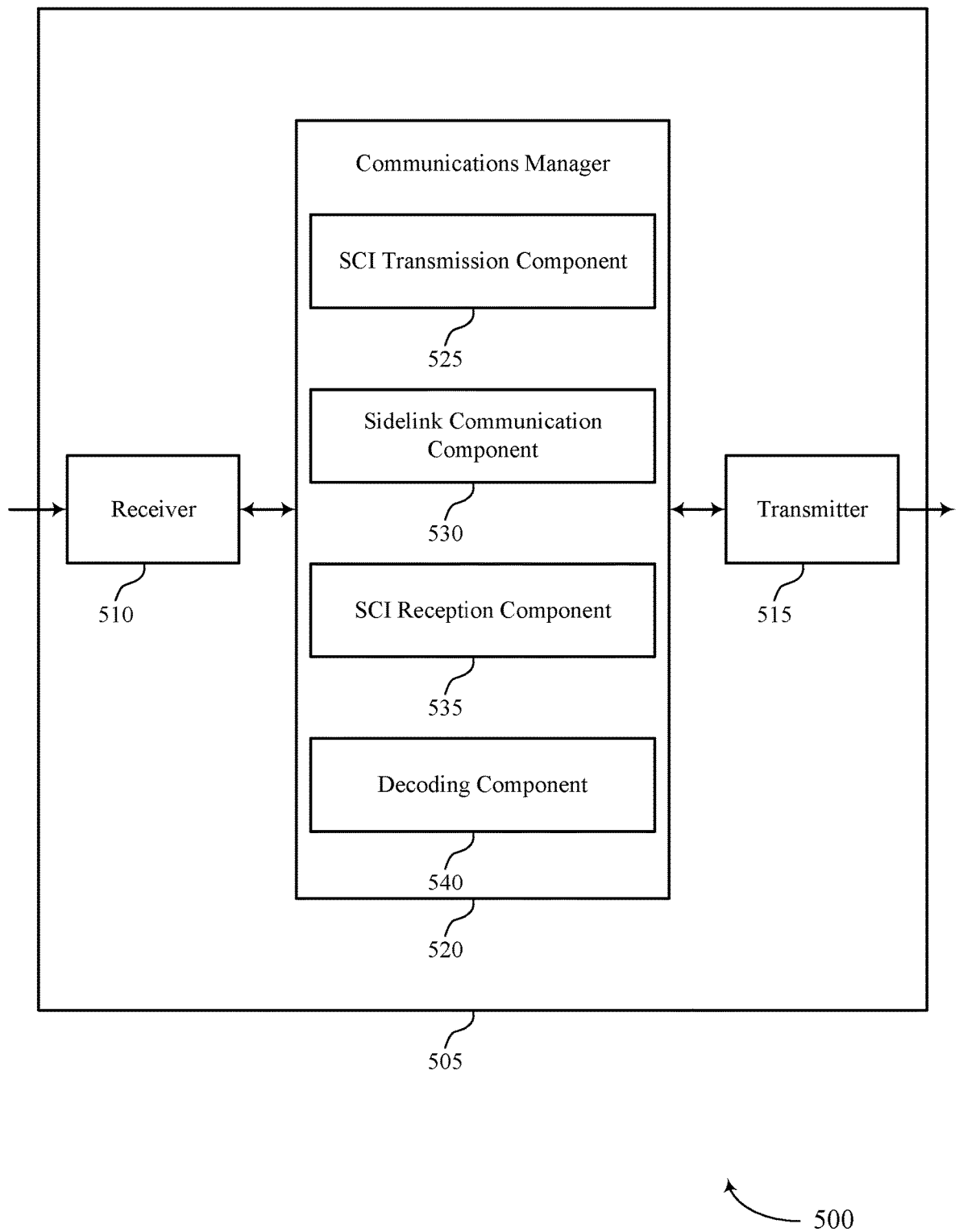

FIG. 5 shows a block diagram 500 of a device 505 that supports identifier reinterpretation in SCI in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to identifier reinterpretation in SCI). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to identifier reinterpretation in SCI). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of identifier reinterpretation in SCI as described herein. For example, the communications manager 520 may include an SCI transmission component 525, a sidelink communication component 530, an SCI reception component 535, a decoding component 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. The SCI transmission component 525 may be configured as or otherwise support a means for transmitting, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier. The sidelink communication component 530 may be configured as or otherwise support a means for communicating on the sidelink channel based on the SCI and the first interpretation for the partial source identifier field and the partial destination identifier field.

Additionally, or alternatively, the communications manager 520 may support wireless communications at a UE in accordance with examples as disclosed herein. The SCI reception component 535 may be configured as or otherwise support a means for receiving, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier. The decoding component 540 may be configured as or otherwise support a means for decoding the partial source identifier field and the partial destination identifier field based on the first interpretation. The sidelink communication component 530 may be configured as or otherwise support a means for communicating on the sidelink channel based on the SCI and the decoding.

Figure 6:
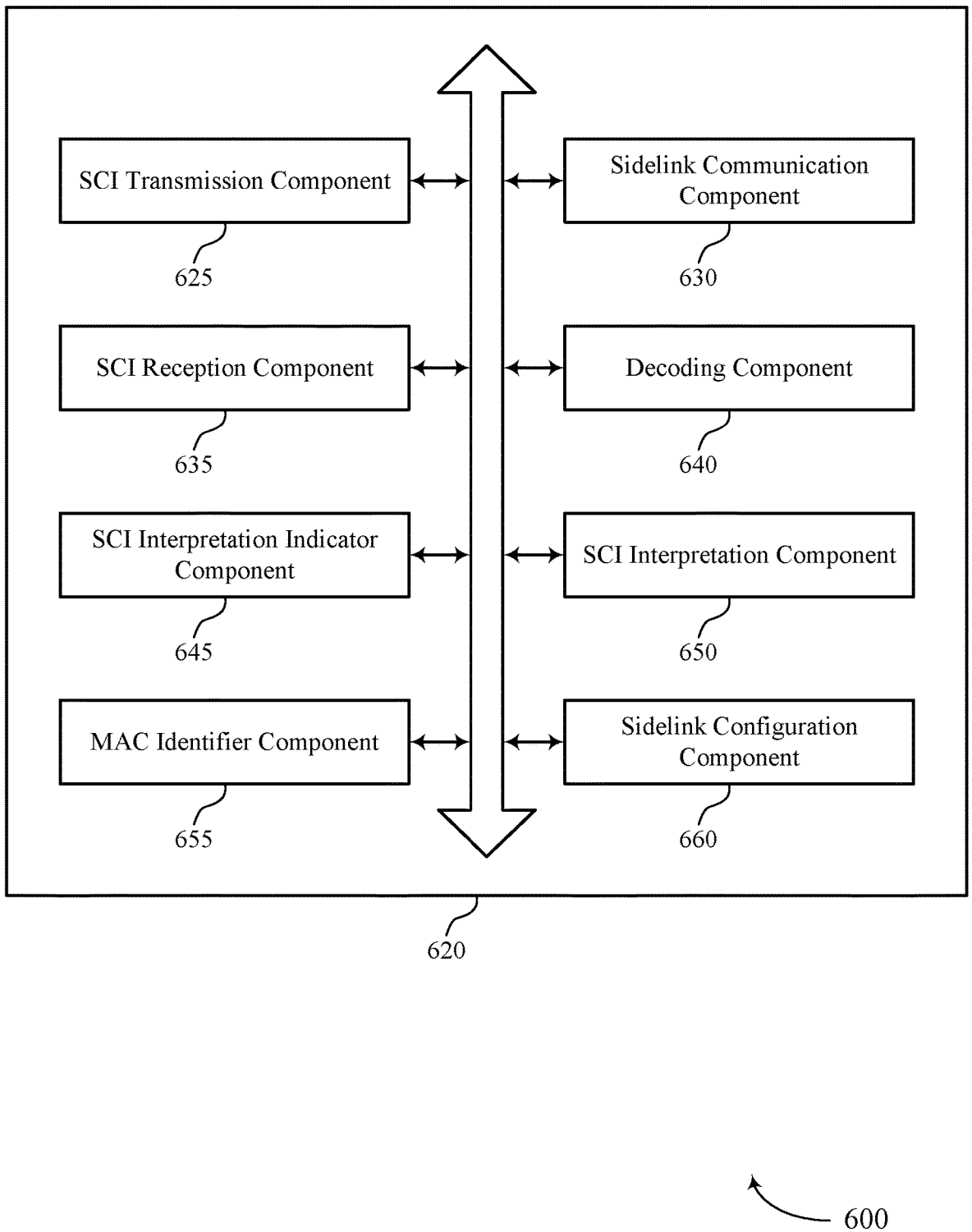
FIG. 6 shows a block diagram of a communications manager that supports identifier reinterpretation in SCI in accordance with one or more aspects of the present disclosure.

FIG. 6 shows a block diagram 600 of a communications manager 620 that supports identifier reinterpretation in SCI in accordance with one or more aspects of the present disclosure. The communications manager 620 may be an example of aspects of a communications manager 420, a communications manager 520, or both, as described herein. The communications manager 620, or various components thereof, may be an example of means for performing various aspects of identifier reinterpretation in SCI as described herein. For example, the communications manager 620 may include an SCI transmission component 625, a sidelink communication component 630, an SCI reception component 635, a decoding component 640, an SCI interpretation indicator component 645, an SCI interpretation component 650, a MAC identifier component 655, a sidelink configuration component 660, or any combination thereof. Each of these components may communicate, directly or indirectly, with one another (e.g., via one or more buses).

The communications manager 620 may support wireless communications at a UE in accordance with examples as disclosed herein. The SCI transmission component 625 may be configured as or otherwise support a means for transmitting, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier. The sidelink communication component 630 may be configured as or otherwise support a means for communicating on the sidelink channel based on the SCI and the first interpretation for the partial source identifier field and the partial destination identifier field.

In some examples, to support transmitting the SCI, the SCI interpretation indicator component 645 may be configured as or otherwise support a means for transmitting the SCI indicating to interpret the partial source identifier field and the partial destination identifier field in combination as the source identifier field or the destination identifier field based on one or more other fields of the SCI.

In some examples, the SCI indicates to interpret the partial source identifier field and the partial destination identifier field in combination as a source identifier field based on the SCI scheduling a CSI-RS.

In some examples, the SCI indicates to interpret the partial source identifier field and the partial destination identifier field as the destination identifier field based on the SCI scheduling resources on the sidelink channel.

In some examples, to support transmitting the SCI, the SCI interpretation component 650 may be configured as or otherwise support a means for transmitting the SCI including one or more bits indicating the first interpretation for the partial source identifier field and the partial destination identifier field.

In some examples, the one or more bits indicate to interpret the partial source identifier field and the partial destination identifier field in combination as the source identifier field, or the partial source identifier field and the partial destination identifier field in combination as the destination identifier field, or the partial source identifier field as a partial source identifier and the partial destination identifier field as a partial destination identifier.

In some examples, the MAC identifier component 655 may be configured as or otherwise support a means for transmitting a MAC packet including a MAC header, where the MAC header includes an identifier field based on the first interpretation for the partial source identifier field and the partial destination identifier field.

In some examples, the identifier field includes a source identifier based on the SCI indicating to interpret the partial source identifier field and the partial destination identifier field as the destination identifier field.

In some examples, the identifier field includes a destination identifier based on the SCI indicating to interpret the partial source identifier field and the partial destination identifier field as the source identifier field.

In some examples, the sidelink configuration component 660 may be configured as or otherwise support a means for receiving, from a second UE, an indication of a quantity of sidelink channels configured at the second UE, where the first interpretation for the partial source identifier field and the partial destination identifier field is based on the quantity of sidelink channels configured at the second UE.

Additionally, or alternatively, the communications manager 620 may support wireless communications at a UE in accordance with examples as disclosed herein. The SCI reception component 635 may be configured as or otherwise support a means for receiving, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier. The decoding component 640 may be configured as or otherwise support a means for decoding the partial source identifier field and the partial destination identifier field based on the first interpretation. In some examples, the sidelink communication component 630 may be configured as or otherwise support a means for communicating on the sidelink channel based on the SCI and the decoding.

In some examples, to support receiving the SCI, the SCI interpretation indicator component 645 may be configured as or otherwise support a means for receiving the SCI indicating to interpret the partial source identifier field and the partial destination identifier field in combination as the source identifier field or the destination identifier field based on one or more other fields of the SCI.

In some examples, the SCI indicates to interpret the partial source identifier field and the partial destination identifier field in combination as the source identifier field based on the SCI scheduling a CSI-RS.

In some examples, the SCI indicates to interpret the partial source identifier field and the partial destination identifier field as the destination identifier field based on the SCI scheduling resources on the sidelink channel.

In some examples, to support receiving the SCI, the SCI interpretation component 650 may be configured as or otherwise support a means for receiving the SCI including one or more bits indicating the first interpretation for the partial source identifier field and the partial destination identifier field.

In some examples, the one or more bits indicate to interpret the partial source identifier field and the partial destination identifier field in combination as the source identifier field, or the partial source identifier field and the partial destination identifier field in combination as the destination identifier field, or the partial source identifier field as the partial source identifier and the partial destination identifier field as the partial destination identifier.

In some examples, the MAC identifier component 655 may be configured as or otherwise support a means for receiving a MAC packet including a MAC header, where the MAC header includes an identifier field based on the first interpretation for the partial source identifier field and the partial destination identifier field.

In some examples, the identifier field includes a source identifier based on the SCI indicating to interpret the partial source identifier field and the partial destination identifier field as the destination identifier field.

In some examples, the identifier field includes a destination identifier based on the SCI indicating to interpret the partial source identifier field and the partial destination identifier field as the source identifier field.

In some examples, the sidelink configuration component 660 may be configured as or otherwise support a means for transmitting an indication of a quantity of sidelink channels configured at the UE, where the first interpretation for the partial source identifier field and the partial destination identifier field is based on the quantity of sidelink channels configured at the UE.

Figure 7:
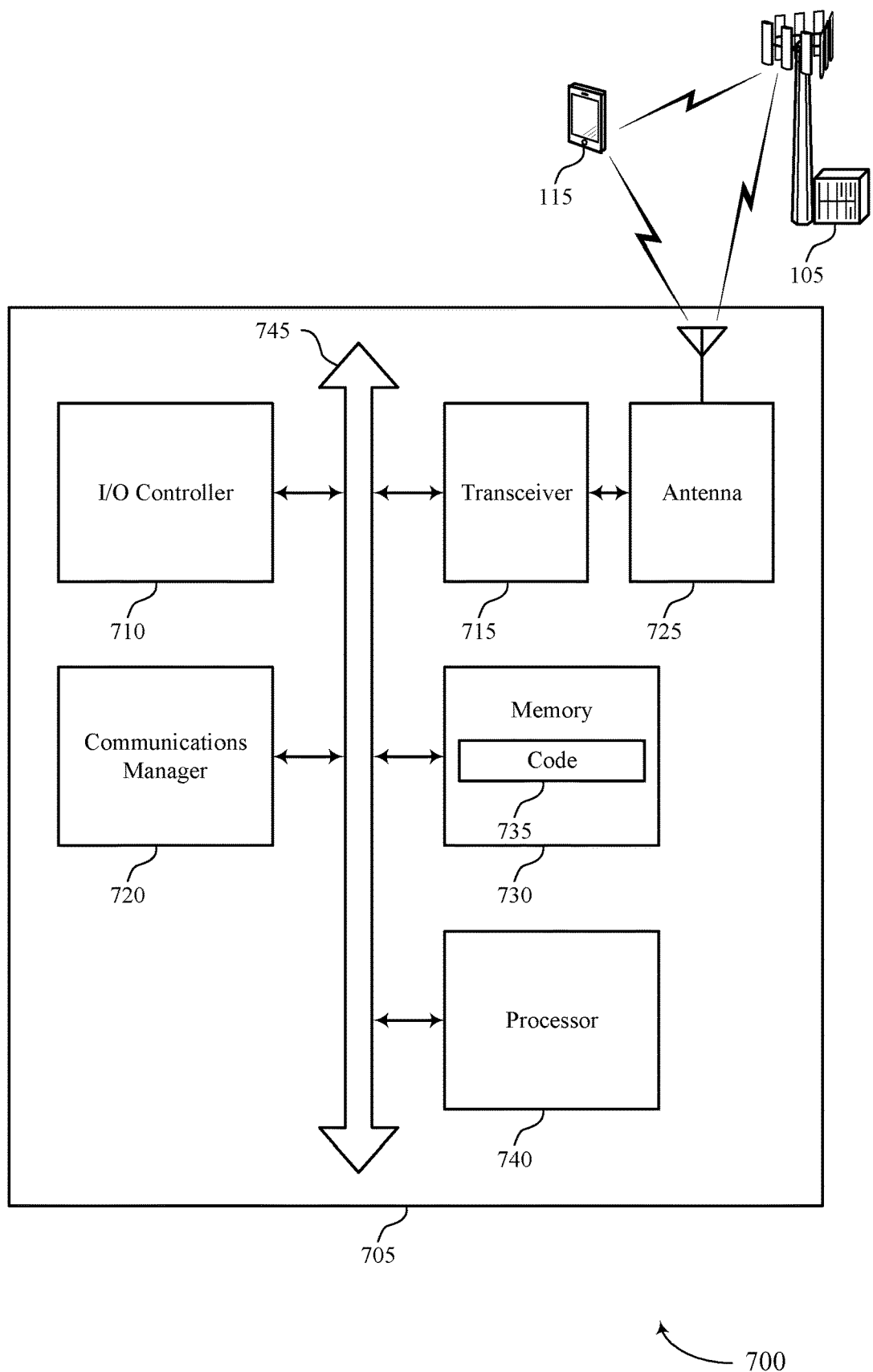
FIG. 7 shows a diagram of a system including a device that supports identifier reinterpretation in SCI in accordance with one or more aspects of the present disclosure.

FIG. 7 shows a diagram of a system 700 including a device 705 that supports identifier reinterpretation in SCI in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting identifier reinterpretation in SCI). For example, the device 705 or a component of the device 705 may include a processor 740 and memory 730 coupled with or to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for transmitting, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier. The communications manager 720 may be configured as or otherwise support a means for communicating on the sidelink channel based on the SCI and the first interpretation for the partial source identifier field and the partial destination identifier field.

Additionally, or alternatively, the communications manager 720 may support wireless communications at a UE in accordance with examples as disclosed herein. For example, the communications manager 720 may be configured as or otherwise support a means for receiving, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier. The communications manager 720 may be configured as or otherwise support a means for decoding the partial source identifier field and the partial destination identifier field based on the first interpretation. The communications manager 720 may be configured as or otherwise support a means for communicating on the sidelink channel based on the SCI and the decoding.

By including or configuring the communications manager 720 in accordance with examples as described herein, the device 705 may support techniques for improved communication reliability, reduced power consumption, and improved coordination between devices. For example, these techniques may enable reliable standalone SCI transmission. By indicating, for example, a complete source identifier in an SCI scheduling CSI-RS without data transmission, a receiving UE 115 may identify itself as the destination UE 115 without ambiguity. Similarly, for a standalone SCI, a receiving UE 115 may obtain a full destination identifier to determine whether the receiving UE 115 is the intended receiver. For a standalone sidelink CSI-RS in sidelink relay, the relay UE may be able to determine a complete source identifier from the standalone SCI, which provides sufficient information to determine where to report CSI measurements.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of identifier reinterpretation in SCI as described herein, or the processor 740 and the memory 730 may be otherwise configured to perform or support such operations.

FIG. 8 shows a flowchart illustrating a method 800 that supports identifier reinterpretation in SCI in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include transmitting, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier. The operations of 805 may be performed in accordance with examples as disclosed herein. In some examples, aspects of the operations of 805 may be performed by an SCI transmission component 625 as described with reference to FIG. 6.

At 810, the method may include communicating on the sidelink channel based on the SCI and the first interpretation for the partial source identifier field and the partial destination identifier field. The operations of 810 may be performed in accordance with examples as disclosed herein. In some examples, aspects of the operations of 810 may be performed by a sidelink communication component 630 as described with reference to FIG. 6.

Figure 9:
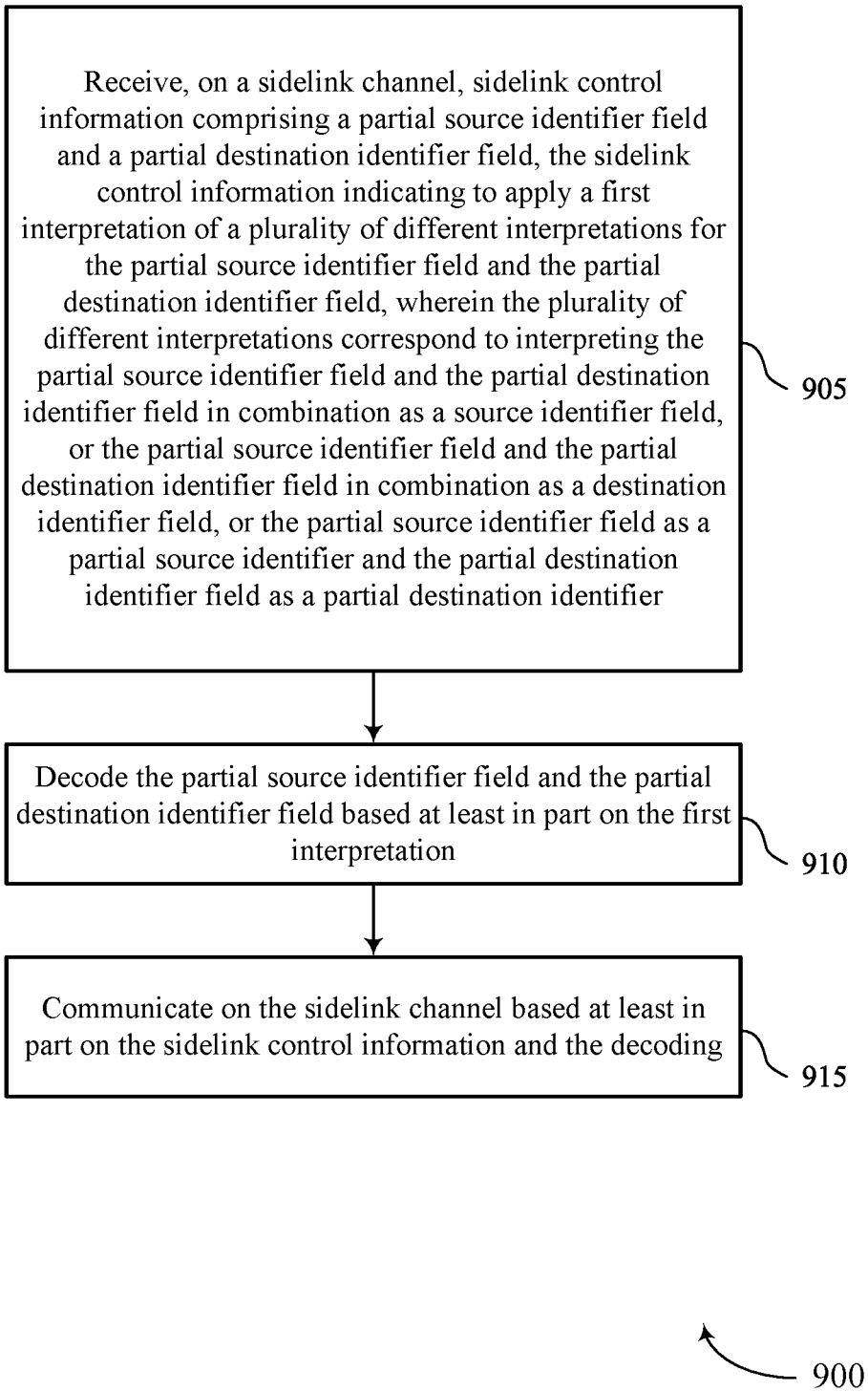

FIG. 9 shows a flowchart illustrating a method 900 that supports identifier reinterpretation in SCI in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include receiving, on a sidelink channel, SCI including a partial source identifier field and a partial destination identifier field, the SCI indicating to apply a first interpretation of a set of multiple different interpretations for the partial source identifier field and the partial destination identifier field, where the set of multiple different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier. The operations of 905 may be performed in accordance with examples as disclosed herein. In some examples, aspects of the operations of 905 may be performed by an SCI reception component 635 as described with reference to FIG. 6.

At 910, the method may include decoding the partial source identifier field and the partial destination identifier field based on the first interpretation. The operations of 910 may be performed in accordance with examples as disclosed herein. In some examples, aspects of the operations of 910 may be performed by a decoding component 640 as described with reference to FIG. 6.

At 915, the method may include communicating on the sidelink channel based on the SCI and the decoding. The operations of 915 may be performed in accordance with examples as disclosed herein. In some examples, aspects of the operations of 915 may be performed by a sidelink communication component 630 as described with reference to FIG. 6.

The following provides an overview of aspects of the present disclosure:

Aspect 1: A method for wireless communications at a UE, comprising: transmitting, on a sidelink channel, sidelink control information comprising a partial source identifier field and a partial destination identifier field, the sidelink control information indicating to apply a first interpretation of a plurality of different interpretations for the partial source identifier field and the partial destination identifier field, wherein the plurality of different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier; and communicating on the sidelink channel based at least in part on the sidelink control information and the first interpretation for the partial source identifier field and the partial destination identifier field.

Aspect 2: The method of aspect 1, wherein transmitting the sidelink control information comprises: transmitting the sidelink control information indicating to interpret the partial source identifier field and the partial destination identifier field in combination as the source identifier field or the destination identifier field based at least in part on one or more other fields of the sidelink control information.

Aspect 3: The method of aspect 2, wherein the sidelink control information indicates to interpret the partial source identifier field and the partial destination identifier field in combination as a source identifier field based at least in part on the sidelink control information scheduling a channel state information reference signal.

Aspect 4: The method of any of aspects 2 through 3, wherein the sidelink control information indicates to interpret the partial source identifier field and the partial destination identifier field as the destination identifier field based at least in part on the sidelink control information scheduling resources on the sidelink channel.

Aspect 5: The method of any of aspects 1 through 4, wherein transmitting the sidelink control information comprises: transmitting the sidelink control information including one or more bits indicating the first interpretation for the partial source identifier field and the partial destination identifier field.

Aspect 6: The method of aspect 5, wherein the one or more bits indicate to interpret the partial source identifier field and the partial destination identifier field in combination as the source identifier field, or the partial source identifier field and the partial destination identifier field in combination as the destination identifier field, or the partial source identifier field as a partial source identifier and the partial destination identifier field as a partial destination identifier.

Aspect 7: The method of any of aspects 1 through 6, further comprising: transmitting a medium access control packet including a medium access header, wherein the medium access header includes an identifier field based at least in part on the first interpretation for the partial source identifier field and the partial destination identifier field.

Aspect 8: The method of aspect 7, wherein the identifier field includes a source identifier based at least in part on the sidelink control information indicating to interpret the partial source identifier field and the partial destination identifier field as the destination identifier field.

Aspect 9: The method of any of aspects 7 through 8, wherein the identifier field includes a destination identifier based at least in part on the sidelink control information indicating to interpret the partial source identifier field and the partial destination identifier field as the source identifier field.

Aspect 10: The method of any of aspects 1 through 9, further comprising: receiving, from a second UE, an indication of a quantity of sidelink channels configured at the second UE, wherein the first interpretation for the partial source identifier field and the partial destination identifier field is based at least in part on the quantity of sidelink channels configured at the second UE.

Aspect 11: A method for wireless communications at a UE, comprising: receiving, on a sidelink channel, sidelink control information comprising a partial source identifier field and a partial destination identifier field, the sidelink control information indicating to apply a first interpretation of a plurality of different interpretations for the partial source identifier field and the partial destination identifier field, wherein the plurality of different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier; decoding the partial source identifier field and the partial destination identifier field based at least in part on the first interpretation; and communicating on the sidelink channel based at least in part on the sidelink control information and the decoding.

Aspect 12: The method of aspect 11, wherein receiving the sidelink control information comprises: receiving the sidelink control information indicating to interpret the partial source identifier field and the partial destination identifier field in combination as the source identifier field or the destination identifier field based at least in part on one or more other fields of the sidelink control information.

Aspect 13: The method of aspect 12, wherein the sidelink control information indicates to interpret the partial source identifier field and the partial destination identifier field in combination as the source identifier field based at least in part on the sidelink control information scheduling a channel state information reference signal.

Aspect 14: The method of any of aspects 12 through 13, wherein the sidelink control information indicates to interpret the partial source identifier field and the partial destination identifier field as the destination identifier field based at least in part on the sidelink control information scheduling resources on the sidelink channel.

Aspect 15: The method of any of aspects 11 through 14, wherein receiving the sidelink control information comprises: receiving the sidelink control information including one or more bits indicating the first interpretation for the partial source identifier field and the partial destination identifier field.

Aspect 16: The method of aspect 15, wherein the one or more bits indicate to interpret the partial source identifier field and the partial destination identifier field in combination as the source identifier field, or the partial source identifier field and the partial destination identifier field in combination as the destination identifier field, or the partial source identifier field as the partial source identifier and the partial destination identifier field as the partial destination identifier.

Aspect 17: The method of any of aspects 11 through 16, further comprising: receiving a medium access control packet including a medium access header, wherein the medium access header includes an identifier field based at least in part on the first interpretation for the partial source identifier field and the partial destination identifier field.

Aspect 18: The method of aspect 17, wherein the identifier field includes a source identifier based at least in part on the sidelink control information indicating to interpret the partial source identifier field and the partial destination identifier field as the destination identifier field.

Aspect 19: The method of any of aspects 17 through 18, wherein the identifier field includes a destination identifier based at least in part on the sidelink control information indicating to interpret the partial source identifier field and the partial destination identifier field as the source identifier field.

Aspect 20: The method of any of aspects 11 through 19, further comprising: transmitting an indication of a quantity of sidelink channels configured at the UE, wherein the first interpretation for the partial source identifier field and the partial destination identifier field is based at least in part on the quantity of sidelink channels configured at the UE.

Aspect 21: An apparatus for wireless communications at a UE, comprising a processor; memory coupled with the processor; and instructions stored in the memory and executable by the processor to cause the apparatus to perform a method of any of aspects 1 through 10.

Aspect 22: An apparatus for wireless communications at a UE, comprising at least one means for performing a method of any of aspects 1 through 10.

Aspect 23: A non-transitory computer-readable medium storing code for wireless communications at a UE, the code comprising instructions executable by a processor to perform a method of any of aspects 1 through 10.

Aspect 24: An apparatus for wireless communications at a UE, comprising a processor; memory coupled with the processor; and instructions stored in the memory and executable by the processor to cause the apparatus to perform a method of any of aspects 11 through 20.

Aspect 25: An apparatus for wireless communications at a UE, comprising at least one means for performing a method of any of aspects 11 through 20.

Aspect 26: A non-transitory computer-readable medium storing code for wireless communications at a UE, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   transmitting, on a sidelink channel, sidelink control information comprising a partial source identifier field and a partial destination identifier field, the sidelink control information indicating to apply a first interpretation of a plurality of different interpretations for the partial source identifier field and the partial destination identifier field, wherein the plurality of different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier; and
   communicating on the sidelink channel based at least in part on the sidelink control information and the first interpretation for the partial source identifier field and the partial destination identifier field.

2. The method of claim 1, wherein transmitting the sidelink control information comprises:
   transmitting the sidelink control information indicating to interpret the partial source identifier field and the partial destination identifier field in combination as the source identifier field or the destination identifier field based at least in part on one or more other fields of the sidelink control information.

3. The method of claim 2, wherein the sidelink control information indicates to interpret the partial source identifier field and the partial destination identifier field in combination as a source identifier field based at least in part on the sidelink control information scheduling a channel state information reference signal.

4. The method of claim 2, wherein the sidelink control information indicates to interpret the partial source identifier field and the partial destination identifier field as the destination identifier field based at least in part on the sidelink control information scheduling resources on the sidelink channel.

5. The method of claim 1, wherein transmitting the sidelink control information comprises:
   transmitting the sidelink control information including one or more bits indicating the first interpretation for the partial source identifier field and the partial destination identifier field.

6. The method of claim 5, wherein the one or more bits indicate to interpret the partial source identifier field and the partial destination identifier field in combination as the source identifier field, or the partial source identifier field and the partial destination identifier field in combination as the destination identifier field, or the partial source identifier field as a partial source identifier and the partial destination identifier field as a partial destination identifier.

7. The method of claim 1, further comprising:
transmitting a medium access control packet including a medium access control header, wherein the medium access control header includes an identifier field based at least in part on the first interpretation for the partial source identifier field and the partial destination identifier field.

8. The method of claim 7, wherein the identifier field includes a source identifier based at least in part on the sidelink control information indicating to interpret the partial source identifier field and the partial destination identifier field as the destination identifier field.

9. The method of claim 7, wherein the identifier field includes a destination identifier based at least in part on the sidelink control information indicating to interpret the partial source identifier field and the partial destination identifier field as the source identifier field.

10. The method of claim 1, further comprising:
receiving, from a second UE, an indication of a quantity of sidelink channels configured at the second UE, wherein the first interpretation for the partial source identifier field and the partial destination identifier field is based at least in part on the quantity of sidelink channels configured at the second UE.

11. A method for wireless communications at a user equipment (UE), comprising:
receiving, on a sidelink channel, sidelink control information comprising a partial source identifier field and a partial destination identifier field, the sidelink control information indicating to apply a first interpretation of a plurality of different interpretations for the partial source identifier field and the partial destination identifier field, wherein the plurality of different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier;
decoding the partial source identifier field and the partial destination identifier field based at least in part on the first interpretation; and
communicating on the sidelink channel based at least in part on the sidelink control information and the decoding.

12. The method of claim 11, wherein receiving the sidelink control information comprises:
receiving the sidelink control information indicating to interpret the partial source identifier field and the partial destination identifier field in combination as the source identifier field or the destination identifier field based at least in part on one or more other fields of the sidelink control information.

13. The method of claim 12, wherein the sidelink control information indicates to interpret the partial source identifier field and the partial destination identifier field in combination as the source identifier field based at least in part on the sidelink control information scheduling a channel state information reference signal.

14. The method of claim 12, wherein the sidelink control information indicates to interpret the partial source identifier field and the partial destination identifier field as the destination identifier field based at least in part on the sidelink control information scheduling resources on the sidelink channel.

15. The method of claim 11, wherein receiving the sidelink control information comprises:
receiving the sidelink control information including one or more bits indicating the first interpretation for the partial source identifier field and the partial destination identifier field.

16. The method of claim 15, wherein the one or more bits indicate to interpret the partial source identifier field and the partial destination identifier field in combination as the source identifier field, or the partial source identifier field and the partial destination identifier field in combination as the destination identifier field, or the partial source identifier field as the partial source identifier and the partial destination identifier field as the partial destination identifier.

17. The method of claim 11, further comprising:
receiving a medium access control packet including a medium access control header, wherein the medium access control header includes an identifier field based at least in part on the first interpretation for the partial source identifier field and the partial destination identifier field.

18. The method of claim 17, wherein the identifier field includes a source identifier based at least in part on the sidelink control information indicating to interpret the partial source identifier field and the partial destination identifier field as the destination identifier field.

19. The method of claim 17, wherein the identifier field includes a destination identifier based at least in part on the sidelink control information indicating to interpret the partial source identifier field and the partial destination identifier field as the source identifier field.

20. The method of claim 11, further comprising:
transmitting an indication of a quantity of sidelink channels configured at the UE, wherein the first interpretation for the partial source identifier field and the partial destination identifier field is based at least in part on the quantity of sidelink channels configured at the UE.

21. An apparatus for wireless communications at a user equipment (UE), comprising:
a processor;
memory coupled with the processor; and
instructions stored in the memory and executable by the processor to cause the apparatus to:
transmit, on a sidelink channel, sidelink control information comprising a partial source identifier field and a partial destination identifier field, the sidelink control information indicating to apply a first interpretation of a plurality of different interpretations for the partial source identifier field and the partial destination identifier field, wherein the plurality of different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier; and communicate on the sidelink channel based at least in part on the sidelink control information and the first interpretation for the partial source identifier field and the partial destination identifier field.

22. The apparatus of claim 21, wherein the instructions to transmit the sidelink control information are executable by the processor to cause the apparatus to:

transmit the sidelink control information indicating to interpret the partial source identifier field and the partial destination identifier field in combination as the source identifier field or the destination identifier field based at least in part on one or more other fields of the sidelink control information.

23. The apparatus of claim 21, wherein the instructions to transmit the sidelink control information are executable by the processor to cause the apparatus to:

transmit the sidelink control information including one or more bits indicating the first interpretation for the partial source identifier field and the partial destination identifier field.

24. The apparatus of claim 21, wherein the instructions are further executable by the processor to cause the apparatus to:

transmit a medium access control packet including a medium access control header, wherein the medium access control header includes an identifier field based at least in part on the first interpretation for the partial source identifier field and the partial destination identifier field.

25. The apparatus of claim 21, wherein the instructions are further executable by the processor to cause the apparatus to:

receive, from a second UE, an indication of a quantity of sidelink channels configured at the second UE, wherein the first interpretation for the partial source identifier field and the partial destination identifier field is based at least in part on the quantity of sidelink channels configured at the second UE.

26. An apparatus for wireless communications at a user equipment (UE), comprising:

a processor;

memory coupled with the processor; and instructions stored in the memory and executable by the processor to cause the apparatus to:

receive, on a sidelink channel, sidelink control information comprising a partial source identifier field and a partial destination identifier field, the sidelink control information indicating to apply a first interpretation of a plurality of different interpretations for the partial source identifier field and the partial destination identifier field, wherein the plurality of different interpretations correspond to interpreting the partial source identifier field and the partial destination identifier field in combination as a source identifier field, or the partial source identifier field and the partial destination identifier field in combination as a destination identifier field, or the partial source identifier field as a partial source identifier and the partial destination identifier field as a partial destination identifier;

decode the partial source identifier field and the partial destination identifier field based at least in part on the first interpretation; and communicate on the sidelink channel based at least in part on the sidelink control information and the decoding.

27. The apparatus of claim 26, wherein the instructions to receive the sidelink control information are executable by the processor to cause the apparatus to:

receive the sidelink control information indicating to interpret the partial source identifier field and the partial destination identifier field in combination as the source identifier field or the destination identifier field based at least in part on one or more other fields of the sidelink control information.

28. The apparatus of claim 26, wherein the instructions to receive the sidelink control information are executable by the processor to cause the apparatus to:

receive the sidelink control information including one or more bits indicating the first interpretation for the partial source identifier field and the partial destination identifier field.

29. The apparatus of claim 26, wherein the instructions are further executable by the processor to cause the apparatus to:

receive a medium access control packet including a medium access control header, wherein the medium access control header includes an identifier field based at least in part on the first interpretation for the partial source identifier field and the partial destination identifier field.

30. The apparatus of claim 26, wherein the instructions are further executable by the processor to cause the apparatus to:

transmit an indication of a quantity of sidelink channels configured at the UE, wherein the first interpretation for the partial source identifier field and the partial destination identifier field is based at least in part on the quantity of sidelink channels configured at the UE.

* * * * *